L. E. YOUNIE.
FRICTION CLUTCH.
APPLICATION FILED JAN. 6, 1917. RENEWED DEC. 12, 1917.

1,266,189.

Patented May 14, 1918.
2 SHEETS—SHEET 1.

Inventor
Lewis E. Younie

By
*(attorney signature)*

Attorney

L. E. YOUNIE.
FRICTION CLUTCH.
APPLICATION FILED JAN. 6, 1917. RENEWED DEC. 12, 1917.

1,266,189.

Patented May 14, 1918.
2 SHEETS—SHEET 2.

Inventor
Lewis E. Younie

By
Attorney

UNITED STATES PATENT OFFICE.

LEWIS E. YOUNIE, OF PORTLAND, OREGON.

FRICTION-CLUTCH.

1,266,189.  Specification of Letters Patent.  Patented May 14, 1918.

Application filed January 6, 1917, Serial No. 140,875. Renewed December 12, 1917. Serial No. 206,857.

*To all whom it may concern:*

Be it known that I, LEWIS E. YOUNIE, a citizen of the United States, residing at Portland, in the county of Multnomah and State of Oregon, have invented new and useful Improvements in Friction-Clutches, of which the following is a specification.

This invention relates to clutch mechanisms and consists in certain improvements in the construction thereof as will be hereinafter fully described and pointed out in the claims.

The object of the invention is to so form a friction clutch in which the friction surfaces are conical that the friction surfaces may be brought into engagement with great force with little effort and at the same time provide for the ready disengagement of the friction surfaces. In the forming of these conical friction clutches the angle of the surfaces to the axis of the clutch has been necessarily such as to assure the ready disengagement of the surfaces when desired. Such an angle required great force in heavy duty clutches to make the engagement sufficient to carry the load. The present invention is designed to obviate this difficulty.

This invention is peculiarly adapted to hoisting drums. Here the clutches are thrown into and out of engagement with great frequency. The loads carried are very heavy and a positive release is necessary.

The invention is illustrated in the accompanying drawings as follows:—

Figure 1:
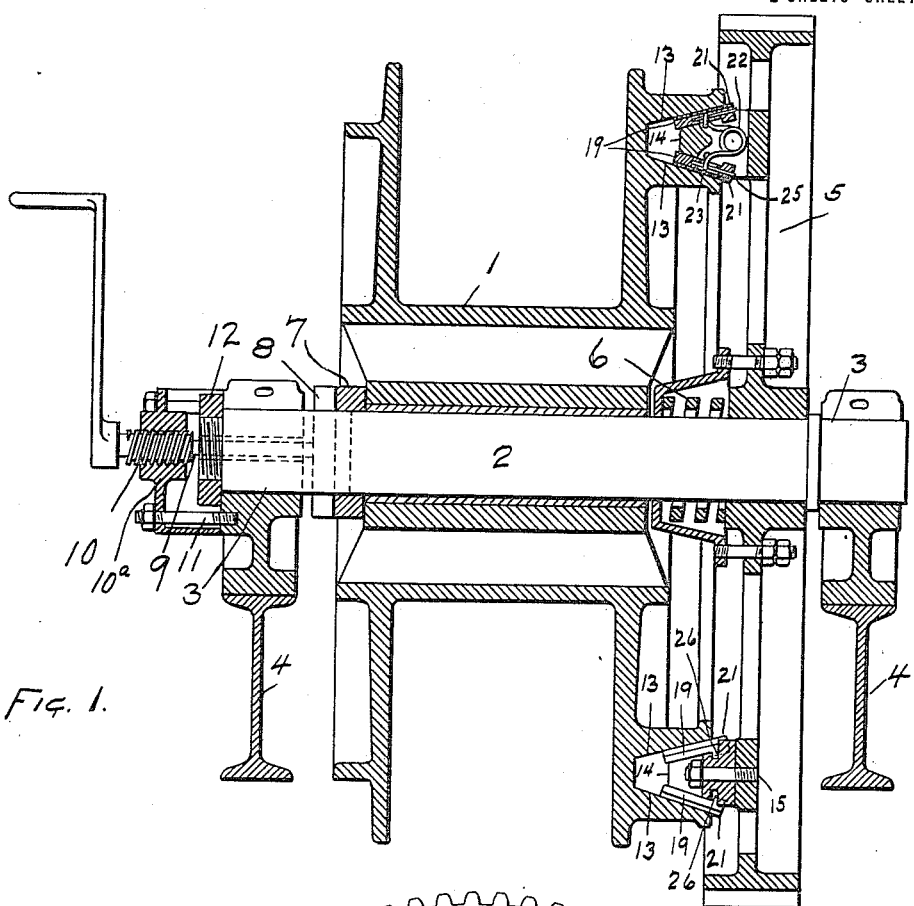
Figure 1 shows a vertical central section of a hoisting drum.
Figure 2:
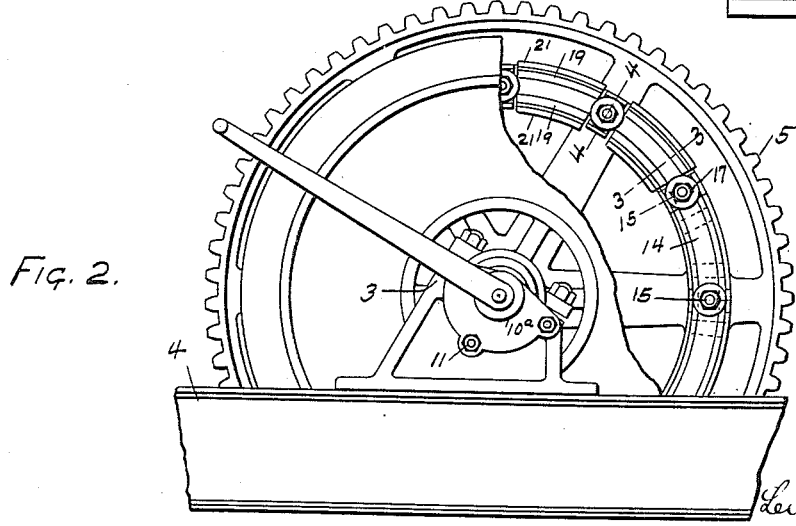
Fig. 2 is an end view of such a drum.

1 marks the drum, 2 the drum shaft, 3 bearings for the drum shaft, 4 the frame on which the hoisting drum is mounted, 5 a drive gear for the drum, 6 springs for forcing the drum axially on the drum shaft to disengage the clutch, 7 a thrust collar operating on the opposite end of the drum, 8 a cross pin extending through the shaft and operating on the collar 7, and 9 a thrust pin arranged in an axial bore in the shaft communicating movement through the bearing from the thrust screw 10 to the cross pin 8. The thrust screw 10 is mounted in the nut 10$^a$ and this nut is secured to the frame by the bolts 11. The end thrust against the shaft 2 is taken up by a collar 12 screwed on to the end of the shaft and operating against the bearing 3. So far this mechanism is, or may be one of common construction.

The friction surfaces 13 are carried by the drum and may be and in some embodiments preferably are conical surfaces. As shown exterior and interior conical surfaces are provided forming what is commonly called a friction groove.

A carrier ring 14 is secured by bolts 15 to the gear 5. The ring has a series of slots 16 on its face which receive the nuts 17 for the bolts. The ring has the wedge faces 18 and the friction segments 19 have actuating faces 20 which rest on the faces 18. A friction surface 21 is formed on the segment 19 and conforms to the surface 13.

The friction surface 21 has a very much more pronounced coefficient of friction than has the faces 20 and 18 and may be formed of any of the well-known materials used for such surfaces, brake bands and the like. The included angle between the surfaces 13 can be made very much less with this construction than where the friction surfaces 21 are carried directly by the ring. Consequently a very much slighter axial thrust is required to set the clutch. With this construction the friction surfaces are brought into engagement as the carrier ring 14 is moved axially and a further movement of the ring forces it inwardly with a relative movement between the faces 18 and 20. Inasmuch as these may be well lubricated and of material operating with little friction the effort is small as compared with the effort required to give a similar movement to the surfaces direct. The included angle between the faces 20 may be the same as the included angle between the surfaces 13. This will depend on a comparison of the resistance to relative movement between the surfaces and between the faces. The included angles should be small enough to insure a setting of the clutch and still the angle should be wide enough to assure its certain disengagement.

Figure 3:
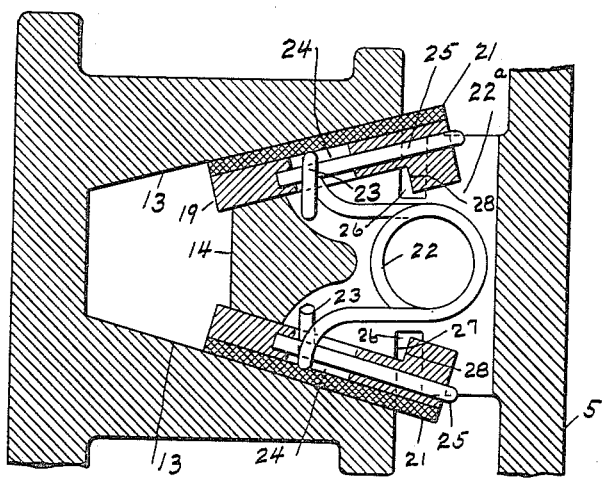
Fig. 3 is an enlarged section on the line 3—3 in Fig. 2.
Figure 4:
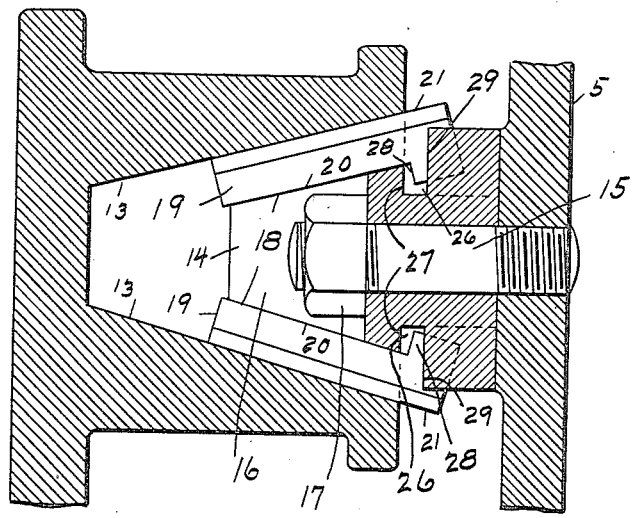
Fig. 4 is an enlarged section on the line 4—4 in Fig. 2.

In order to hold the segments in contact with the faces 18 when the friction surfaces are out of engagement, I provide the springs 22. These springs are arranged in slots 22$^a$ in the carrier ring. These are provided with the loops 23 at their ends which extend into the slots 24 in the segments. The pins 25 are mounted in the segments and extend through the loops 23. The spring is so tensioned as to exert a yielding pressure on the segments drawing them inwardly on the faces 18. The wedging action of this tends to move the segments toward the left as shown in Fig. 3 and to limit this movement I have provided the interlocking shoulders formed by turning the groove 26 in the carrier ring 14, thus forming a shoulder 27 which is engaged by the shoulders 28 on the segments.

Shoulders 29 are arranged on the ring 24 and are so located as to engage the ends of the segments. These shoulders prevent circumferential movement of the segments on the ring and exert a driving thrust against the segments as the ring is rotated.

The invention is particularly applicable to hoisting drums in that the releasing spring not only disengages the clutch but the releasing spring 6 in order to disengage the clutch must move the entire drum. The thrust of such a clutch must be carried through the bearings and consequently any reduction in the effort necessary to set the clutch is of great importance in this construction.

It will be noted that the axial movement of the segments is not necessary in the operation of the device because the axial movement of the wedges inside the segments would move them into or out of contact in a direct radial line This feature is particularly desirable if the slant of the surface 13 is very much reduced and more particularly if this slant is eliminated entirely so as to make the surfaces 13 cylindrical.

What I claim as new is:—

1. In a friction clutch, the combination of a cone surface; segments having a friction surface corresponding to the cone surface and an actuating face back of the friction surface; wedge faces operating on the actuating faces to force the friction surfaces into engagement with the cone surface; and means for holding the faces in contact when the surfaces are disengaged.

2. In a friction clutch, the combination of a cone surface; segments having a friction surface corresponding to the cone surface and an actuating face back of the friction surface; wedge faces operating on the actuating faces to force the friction surfaces into engagement with the cone surface; and springs for holding the faces in contact when the surfaces are disengaged.

3. In a friction clutch, the combination of a cone surface; segments having friction surfaces corresponding to the cone surface and actuating faces back of the friction surfaces; a carrier ring having wedge faces engaging the actuating faces to force the surfaces into engagement; and means for limiting the movement of the segments along the ring and for locking the segments against movement on the ring in a circumferential path.

4. In a friction clutch, the combination of a cone surface; segments having friction surfaces corresponding to the cone surface and actuating faces back of the friction surfaces; a carrier ring having wedge faces engaging the actuating faces to force the surfaces into engagement, the resistance to relative movement between the faces being less than the resistance to relative movement between the surfaces; and means for limiting the axial movement of the segments on the ring and for locking the segments against movement on the ring in a circumferential path.

5. In a friction clutch, the combination of a cone surface; segments having friction surfaces corresponding to the cone surface and actuating faces back of the friction surfaces; a carrier ring having wedge faces engaging the actuating faces to force the surfaces into engagement; and means for limiting the movement of the segments along the ring and for locking the segments against movement on the ring in a circumferential path, comprising interlocking shoulders on the ring and segments.

6. In a friction clutch, the combination of a cone surface; segments having friction surfaces corresponding to the cone surface and actuating faces back of the friction surfaces; a carrier ring having wedge faces engaging the actuating faces to force the surfaces into engagement; and means for locking the segments against movement on the ring in a circumferential path comprising shoulders on the ring engaging said segments.

7. In a friction clutch, the combination of a cone surface; segments having friction surfaces corresponding to the cone surface and actuating faces back of the friction surfaces; a carrier ring having wedge faces engaging the actuating faces to force the surfaces into engagement, said actuating ring having spring sockets; springs arranged in the sockets and secured to the segments, said springs holding said faces in contact and tending to move the segments on the faces as the clutch is disengaged in a direction of movement opposite to the relative movement of the faces as the clutch is engaged.

8. In a friction clutch, the combination of a cone surface; segments having friction surfaces corresponding to the cone surface and actuating faces back of the friction surfaces, said segments being provided with spring slots; a carrier ring having wedge faces engaging the actuating faces to force the surfaces into engagement, said ring having spring slots; springs arranged in the slots in the ring and extending into the slots in the segments; and pins in the segments to which the springs are attached.

9. In a friction clutch, the combination of opposing cone surfaces forming a friction groove; segments having opposing friction surfaces corresponding to the cone surfaces and actuating faces back of the friction surfaces; and a carrier ring having wedge faces operating on the actuating faces and extending between the segments to force the friction surfaces into engagement with the cone surfaces.

10. In a friction clutch, the combination of opposing cone surfaces forming a friction groove; segments having opposing friction surfaces corresponding to the cone surfaces and actuating faces back of the friction surfaces; and a carrier ring having wedge faces operating on the actuating faces and extending between the segments to force the friction surfaces into engagement with the cone surfaces, the resistance to relative movement between the faces being less than the resistance to relative movement between the surfaces.

11. In a friction clutch, the combination of opposing cone surfaces forming a friction groove; segments having opposing friction surfaces corresponding to the cone surfaces and actuating faces back of the friction surfaces; a carrier ring having wedge faces operating on the actuating faces and extending between the segments to force the friction surfaces into engagement with the cone surfaces, said ring having spring slots; and springs arranged in said slots and exerting opposing inward pressure on the opposing segments carried by the ring.

12. In a friction clutch mechanism, the combination of a drum; a shaft on which the drum is mounted; a gear for driving the drum; a friction surface on the drum in the form of a friction groove having opposing cone surfaces; segments having friction surfaces corresponding to the cone surfaces and actuating faces opposite the friction surfaces; a carrier ring mounted on the gear interposed between the segments and having wedge faces operating on the faces on the segments for forcing the segments into engagement; and means for actuating the drum to move the cone surface toward and from the segments.

13. In a friction clutch, the combination of a first friction surface; segments having a second friction surface corresponding to the first friction surface and an actuating face back of the second friction surface; wedge faces operating on the actuating faces to force the friction surfaces into engagement; and means for holding the faces in contact when the surfaces are disengaged.

In testimony whereof I have hereunto set my hand.

LEWIS E. YOUNIE.